US008057355B2

(12) United States Patent
Tryon et al.

(10) Patent No.: US 8,057,355 B2
(45) Date of Patent: *Nov. 15, 2011

(54) HYDRAULIC CONTROL SYSTEM FOR MULTI-MODE HYBRID TRANSMISSION AND METHOD OF REGULATING THE SAME

(75) Inventors: Eric S. Tryon, Indianapolis, IN (US); Michael D. Foster, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 684 days.

This patent is subject to a terminal disclaimer.

(21) Appl. No.: 12/179,961

(22) Filed: Jul. 25, 2008

(65) Prior Publication Data

US 2009/0247355 A1 Oct. 1, 2009

Related U.S. Application Data

(60) Provisional application No. 61/040,878, filed on Mar. 31, 2008.

(51) Int. Cl.
*F16H 61/38* (2006.01)
*F16H 61/26* (2006.01)

(52) U.S. Cl. ............... 477/52; 477/156; 180/65.275

(58) Field of Classification Search .............. 477/3, 7, 477/15, 52, 121, 156–158; 180/65.265, 65, 180/275

See application file for complete search history.

(56) References Cited

U.S. PATENT DOCUMENTS

| | | | | | |
|---|---|---|---|---|---|
| 4,514,147 | A | * | 4/1985 | Borman et al. | 417/288 |
| 5,944,632 | A | * | 8/1999 | Hara et al. | 477/158 |
| 6,799,109 | B2 | * | 9/2004 | Nakamori et al. | 701/54 |
| 6,805,647 | B2 | * | 10/2004 | Silveri et al. | 475/4 |
| 7,041,030 | B2 | * | 5/2006 | Kuroda et al. | 477/21 |
| 2007/0240776 | A1 | * | 10/2007 | Mizui | 137/625.69 |

* cited by examiner

*Primary Examiner* — Tisha Lewis
(74) *Attorney, Agent, or Firm* — Quinn Law Group, PLLC

(57) ABSTRACT

A hydraulic control system for a multi-mode hybrid-type power transmission is provided, including an engine-driven main pump in fluid communication with a main regulator valve, and an electrically driven auxiliary pump in fluid communication with an auxiliary regulator valve. A first pressure control solenoid is configured to provide boost pressure to the main regulator valve and thereby boost output of the main pump. A second pressure control solenoid is configured to provide boost pressure to the auxiliary regulator valve and thereby boost output of the auxiliary pump. The distribution of boost pressure from the pressure control solenoids is selectively modified such that at least one of the flows of pressurized fluid from the pumps is equal to the current line pressure requirements of the transmission during engine auto-start and auto-stop, and transitions thereto. An improved method for regulating the hydraulic control system is also provided.

20 Claims, 4 Drawing Sheets

HYDRAULIC CONTROL SYSTEM FOR MULTI-MODE HYBRID TRANSMISSION AND METHOD OF REGULATING THE SAME

CLAIM OF PRIORITY AND CROSS-REFERENCE TO RELATED APPLICATION

This application claims the benefit of and priority to U.S. Provisional Patent Application No. 61/040,878, filed on Mar. 31, 2008, which is hereby incorporated by reference in its entirety.

TECHNICAL FIELD

The present invention relates generally to motorized vehicle powertrains. More specifically, the present invention relates to hydraulic control systems for multi-mode hybrid-type power transmissions, and methods of operating the same.

BACKGROUND OF THE INVENTION

In general, motorized vehicles, such as the conventional automobile, include a powertrain that is comprised of an engine in power flow communication with a final drive system (e.g., rear differential and wheels) via a multi-speed power transmission. Hybrid type powertrains generally employ an internal combustion engine (ICE) and one or more motor/generator units that operate individually or in concert to propel the vehicle—e.g., power output from the engine and motor/generators are transferred through planetary gearing in the multi-speed transmission to be transmitted to the vehicle's final drive. The primary function of the multi-speed power transmission is to regulate speed and torque to meet operator demands for vehicle speed and acceleration.

To operate properly, the power transmission requires a supply of pressurized fluid, such as conventional transmission oil. The pressurized fluid may be used for such functions as cooling and lubrication. The lubricating and cooling capabilities of transmission oil systems greatly impact the reliability and durability of the transmission. Additionally, multi-speed power transmissions require pressurized fluid for controlled engagement and disengagement, on a desired schedule, of the various torque transmitting mechanisms that operate to establish the speed ratios within the internal gear arrangement.

Transmissions are traditionally supplied with hydraulic fluid by a wet sump (i.e., internal reservoir) oil system, which is separate from the engine's oil system. The fluid is typically stored in a main reservoir or main sump volume where it is introduced to a pickup or inlet tube for communication to the hydraulic pump(s). The pump operates to pressurize the fluid for subsequent communication to the transmission.

It is well known to utilize a fixed displacement (or "PF", according to industry custom) pump in multi-speed transmissions. A PF pump can generate relatively instantaneous pressure and flow to a hydraulic circuit when the circuit is opened due to the positive displacement characteristic of PF type pumps. In addition to, or in lieu of a PF pump, it is also known to use a variable displacement (or "PV", according to industry custom) pump to satisfy the hydraulic fluid needs of a multi-speed transmission. The PV pump produces a variable flow on demand. Thus, in standby conditions, PV pump systems do not circulate as much hydraulic fluid.

One premise behind hybrid-type vehicles is that alternative power is available to propel the vehicle, minimizing reliance on the engine for power, thereby increasing fuel economy. Since hybrid-type vehicles can derive their power from sources other than the engine, engines in hybrid-type vehicles typically operate at lower speeds more often than their traditional counterparts, and can be turned off while the vehicle is propelled by the alternative power source(s). For example, electrically-variable transmissions alternatively rely on electric motors housed in the transmission to power the vehicle's driveline.

Engines in hybrid-type vehicles are required to start and stop more often than engines in non-hybrid systems. When the engine in a hybrid-type vehicle is not operating (i.e., in a power-off state), hydraulic pumps which derive their power solely from the engine may become inoperable. As such, many hybrid powertrains include an electrically driven secondary or auxiliary pump that runs independent of the engine—e.g., powered by the vehicle drive lines or a battery, to provide hydraulic pressure during periods when the engine is shutdown.

Packaging space in and around the powertrain in hybrid-type vehicles is normally scarce, often restricting use of a larger auxiliary pump motor. In addition to architectural limitations, installing a larger pump motor is not always possible due to mass, cost, and fuel economy constraints. As such, the motor of a transmission auxiliary pump may be so small that it may not be able to start reliably under certain conditions. However, a transmission auxiliary pump which fails during transition periods (e.g., transition to hybrid "engine-off driving mode") can potentially result in slip in the transmission launching clutch, and may result in "engine-on" operation only.

Due to size limitations, the auxiliary pump is generally limited in the pressure it can operate against. In most instances, the auxiliary pump operates at significantly less pressure than the engine-driven transmission pump. As such, the auxiliary pump may stall if it is forced to operate at excessive transmission pressures.

SUMMARY OF THE INVENTION

The present invention provides an improved hydraulic control system for a multi-mode hybrid-type power transmission. In order to enhance the efficiency, reliability, and response time of the vehicle powertrain, the present invention also provides improved methods of operating the hydraulic control system. The methods of the present invention ensure continuous clutch pressure at specific controlled levels during all vehicle operations, including engine auto-start and auto-stop, and transitionary periods thereto. In doing so, the present invention protects against pressure drops during pump transitions and pressure handoffs that might otherwise cause a clutch slip or bump. This invention also protects the auxiliary pump from high transmission pressures by providing additional pressure exhaust paths and a boost accumulator valve.

In accordance with a first embodiment of the present invention, a method of regulating a hydraulic control system operable to distribute pressurized fluid to a multi-mode hybrid-type power transmission is provided. The hybrid transmission is in power flow communication with (e.g., selectively drivingly connectable to) an engine and one or more motor assemblies. The hydraulic control system includes an engine-driven main pump in fluid communication with a main regulator valve, and an electrically driven auxiliary pump in fluid communication with an auxiliary regulator valve.

The method includes: determining if the engine is transitioning to an engine auto-stop; if so, determining the line pressure requirements of the transmission under current operating conditions; setting the start-up pressure of the auxiliary pump equal to the minimum auxiliary pump pressure; starting the auxiliary pump; increasing the auxiliary pump speed; modifying the current pressure of the auxiliary pump to equal the current line pressure requirements by providing a boost pressure to the auxiliary regulator valve with a pressure control solenoid that is in fluid communication with the auxiliary regulator valve; and stopping the main pump.

According to one aspect of this embodiment, setting the start-up auxiliary pump pressure equal to a minimum auxiliary pump pressure includes closing the pressure control solenoid, and thereby eliminating boost pressure distributed to the auxiliary regulator valve from the pressure control solenoid.

It is desired that the method of this embodiment also includes reducing the current main pump pressure to equal a minimum main pump pressure prior to stopping the main pump if the engine is transitioning to an engine auto-stop. Reducing the current main pump pressure preferably includes closing an additional pressure control solenoid that is in fluid communication with the main regulator valve, and thereby eliminating boost pressure distributed to the main regulator valve from the pressure control solenoid that is in fluid communication with the main regulator valve.

In accordance with another aspect, stopping the main pump when the engine is transitioning to engine auto-stop is in response to the current auxiliary pump pressure being equal to the current line pressure requirements of the transmission.

It is further desired that the method includes: determining if the engine is transitioning to an engine auto-start; determining the current line pressure requirements of the transmission if the engine is transitioning to an engine auto-start; setting the start-up pressure of the main pump equal to an optimal main pump start-up pressure; starting the main pump; increasing the speed of the main pump; modifying the current pressure of the main pump to equal the current line pressure requirements by providing a boost pressure to the main regulator valve with the additional pressure control solenoid that is in fluid communication therewith; and stopping the auxiliary pump. By utilizing a separate pressure control solenoid for pressure regulation and boost function operation, the output of each pump can be individually optimized under all vehicle operating conditions. Moreover, this invention allows both pumps to be on at the same time at any desired pressure by using independent line pressure control for each.

In this instance, setting the main pump start-up pressure equal to an optimal main pump start-up pressure preferably includes commanding the pressure control solenoid to distribute a predetermined optimal boost gain pressure to the main regulator valve. It is further preferred that the method also includes reducing the current pressure of the auxiliary pump to equal the minimum auxiliary pump pressure prior to stopping the auxiliary pump. The auxiliary pump pressure can be reduced by closing the respective pressure control solenoid, and thereby eliminating boost pressure distributed to the auxiliary regulator valve by the pressure control solenoid in communication therewith. Finally, stopping the auxiliary pump is preferably in response to the current main pump pressure being equal to the current line pressure requirements of the transmission.

In a second embodiment of the present invention, a method of regulating a hydraulic control system for a multi-mode, hybrid-type power transmission is provided. The transmission is in power flow communication with an engine and at least one motor. The hydraulic control system includes an engine-driven main pump in fluid communication with a main regulator valve, and an electrically driven auxiliary pump in fluid communication with an auxiliary regulator valve.

The method comprises: determining if the engine is transitioning to either an engine auto-stop or an engine auto-start; if so, determining the current line pressure requirements of the transmission; setting the start-up pressure of the auxiliary pump equal to a minimum auxiliary pump pressure if the engine is transitioning to an engine auto-stop, or setting the start-up pressure of the main pump equal to an optimal main pump start-up pressure if the engine is transitioning to an engine auto-start; starting the auxiliary pump if the engine is transitioning to an engine auto-stop or the main pump if the engine is transitioning to an engine auto-start; increasing the speed of the started pump; modifying the current pump pressure of the started pump to equal the current line pressure requirements by providing a boost pressure to a corresponding one of the regulator valves utilizing a first pressure control solenoid that is in fluid communication with the auxiliary regulator valve, or a second pressure control solenoid that is in fluid communication with the main regulator valve; and stopping the other of the pumps (e.g., the pump already in an on-state).

In accordance with yet another embodiment, a hydraulic control system for regulating the distribution of pressurized fluid to a multi-mode, hybrid-type power transmission is provided. The transmission is in power flow communication with an engine and one or more motor assemblies. The transmission has a power source, such as a battery or motor/generator assembly, and one or more hydraulic fluid reservoirs. The transmission also has a current line pressure requirement which is dependent upon, for example, current vehicle operating conditions and operator demands.

The hydraulic control system includes a main pump in fluid communication with one of the hydraulic fluid reservoirs, and in driving communication with the engine. The main pump is selectively operable to provide a first flow of pressurized hydraulic fluid to the transmission. The hydraulic control system also includes an auxiliary pump in fluid communication with one of the hydraulic fluid reservoirs, and in driving communication with the power source. The auxiliary pump is selectively operable to provide a second flow of pressurized hydraulic fluid to the transmission. A main regulator valve is in direct fluid communication with the main pump, and configured to regulate the flow of pressurized hydraulic fluid therefrom. Similarly, an auxiliary regulator valve is in direct fluid communication with the auxiliary pump, and configured to regulate the flow of pressurized hydraulic fluid therefrom.

A first pressure control solenoid is in direct fluid communication with the main regulator valve, and configured to provide a first boost pressure to the main regulator valve, and thereby boost output of the main pump. In a similar respect, a second pressure control solenoid is in direct fluid communication with the auxiliary regulator valve. The second pressure control solenoid is configured to provide a second boost pressure to the auxiliary regulator valve, and thereby boost output of the auxiliary pump. A controller is in operative communication with the first and second pressure control solenoids, and configured to control the same. The controller is operable to selectively modify distribution of the first and second boost pressures to the main and auxiliary regulator valves, respectively, such that at least one of the first and second flows of pressurized fluid is equal to the current line pressure requirements of the transmission during engine auto-start and auto-stop and transitions thereto.

According to one aspect of this embodiment, the first pressure control solenoid is characterized by a lack of a direct fluid communication with the auxiliary regulator valve, whereas the second pressure control solenoid is preferably characterized by a lack of a direct fluid communication with the main regulator valve. In this regard, the first pressure control solenoid is preferably in direct fluid communication with the second pressure control solenoid.

In accordance with another aspect, the hydraulic control system includes a boost accumulator valve that is in direct fluid communication with the auxiliary regulator valve. The boost accumulator valve operates to damp fluid pressure fluctuations generated by the combination of the second pressure control solenoid and movement of the auxiliary regulator valve.

In accordance with yet another aspect, the hydraulic control system also includes a transmission oil cooler system (TOC). The TOC is in fluid communication with both the main regulator valve and the auxiliary regulator valve. A cooler relief valve is placed in between the TOC and main regulator valve, and is operable to restrict fluid flow therethrough. Ideally, the auxiliary regulator valve is also in direct fluid communication with the cooler relief valve. Ideally, the auxiliary regulator valve includes an exhaust port, and is configured to exhaust fluid through the exhaust port if pressurized hydraulic fluid from the cooler relief valve exceeds a maximum regulated auxiliary pump pressure. A thermal bypass valve may also be placed intermediate the transmission oil cooler system and both the main and auxiliary regulator valves. The thermal bypass valve is operable to redirect fluid flow past the transmission oil cooler system when the fluid temperature is below a predetermined threshold value.

The above features and advantages, and other features and advantages of the present invention, will be readily apparent from the following detailed description of the preferred embodiments and best modes for carrying out the invention when taken in connection with the accompanying drawings and appended claims.

DESCRIPTION OF THE PREFERRED EMBODIMENT

Figure 1:
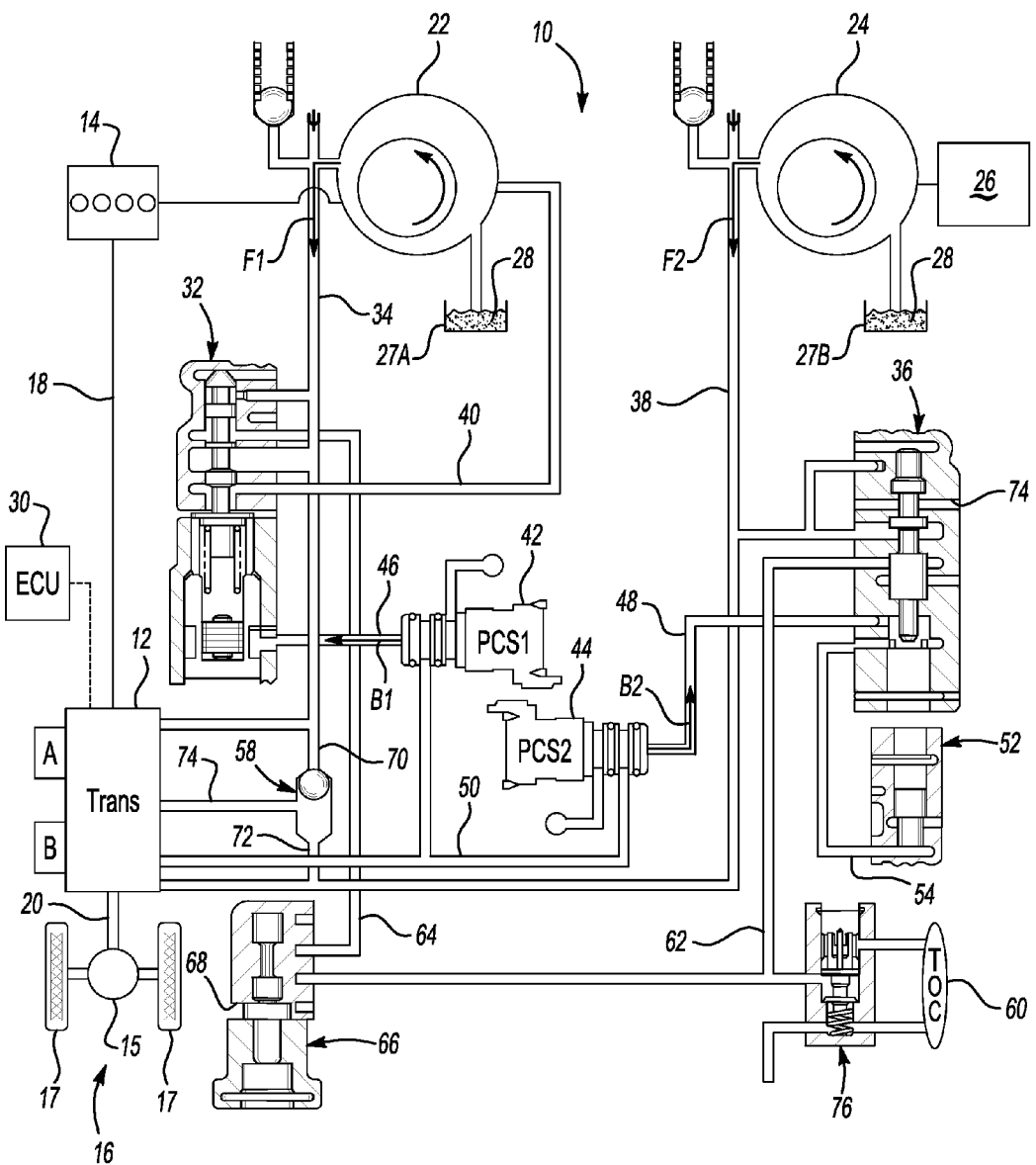
FIG. 1 is a schematic illustration of a vehicle powertrain having a multi-mode, multi-speed, hybrid-type power transmission with a hydraulic control system in accordance with the present invention.

Referring to the drawings, wherein like reference numbers represent the same or corresponding parts throughout the several views, there is shown schematically in FIG. 1 a hydraulic control system, identified generally as 10, for providing lubrication and cooling fluid to various components of a power transmission 12, as well as pressurized fluid for controlled engagement and disengagement of the various torque transmitting mechanisms that operate to establish the forward and reverse speed ratios within the transmission 12. The hydraulic control system 10, although described herein for supplying hydraulic fluid to a multi-mode hybrid-type power transmission 12 of an automobile, may also be applied in other various applications, such as, by way of example, aeronautical vehicles (e.g., airplanes, helicopters, etc.), agricultural vehicles (e.g., combine, tractor, etc.), construction vehicles (e.g., forklift, backhoe, excavator, etc.), and stationary machines (e.g., hydraulic press, hydraulic drill, etc.).

A restartable engine 14 is selectively drivingly connected to, or in power flow communication with, a final drive system 16 via the hybrid-type power transmission 12. The engine 14 transfers power, preferably by way of torque, to the transmission 12 via an engine output shaft 18 (most commonly referred to as a "crankshaft"). The transmission 12 is adapted to manipulate and distribute power from the engine 14 to the final drive system 16, which is represented herein by a rear differential 15 and wheels 17. Specifically, the rear differential 15 is configured to distribute power and torque from a transmission output shaft 20 to drive the plurality of wheels 17 and propel the hybrid vehicle (not specifically identified herein). In the embodiment depicted in FIG. 1, the engine 14 may be any engine, such as, but not limited to, a two-stroke diesel engine or a four-stroke gasoline engine, which is readily adapted to provide its available power output typically at a number of revolutions per minute (RPM). Although not specifically illustrated in FIG. 1, it should be appreciated that the final drive system 16 may comprise any known configuration—e.g., front wheel drive (FWD), rear wheel drive (RWD), four-wheel drive (4WD), or all-wheel drive (AWD).

First and second electric motor/generator assemblies A and B, respectively, are concentric with and connectable to a main shaft (not shown) of the transmission 12, preferably through a series of planetary gear sets (not shown), which operate in concert with one or more selectively engageable torque transmitting mechanisms (e.g., clutches, brakes, etc.) to rotate the transmission output shaft 20. The motor/generator assemblies A, B are preferably configured to selectively operate as a motor and a generator. That is, the motor/generator assemblies A, B are capable of converting electrical energy to mechanical energy (e.g., during vehicle propulsion), and converting mechanical energy to electrical energy (e.g., during regenerative braking).

The hydraulic control system 10 includes a first, main pump 22 (which is also referred to herein as "engine pump" or "engine-driven pump") and a second, auxiliary pump 24 (which is also referred to herein as "aux pump" or "electrically driven pump"). Specifically, the vehicle engine 14 is operatively connected to the main pump 22 to communicate a driving force (i.e., power) thereto. In a similar respect, the hydraulic control system 10 also includes a power source 26 that is operable to communicate a driving force (i.e., power) to the auxiliary pump 24. The power source 26 may comprise any one of various devices operable to provide electrical energy storage capacity and distribution, such as, but not limited to, a battery, fuel cell, capacitor, fly wheel, and the like. It should also be recognized that FIG. 1 is merely a schematic representation and, thus, alternate means of driving each pump are available.

The main pump 22 is preferably of the variable displacement (PV) pump type. The main pump 22 is selectively operable to provide a first flow of pressurized hydraulic fluid (represented for explanatory purposes by arrow F1) to the transmission 12 at various volumes and pressures. The auxiliary pump 24 is preferably a fixed displacement (PF) pump of the positive displacement type. The auxiliary pump 24 is selectively operable to provide a second flow of pressurized hydraulic fluid (represented for illustrative purposes by arrow F2) to the transmission 12. Although not required, the auxiliary pump 24 may be a high-voltage, electric-motor driven 10-tooth gerotor pump. It is also considered to be within the scope of the present invention that both pumps 22, 24 be PV pumps, PF pumps, or any combination thereof.

First and second sump volumes 27A and 27B, respectively (which may, in reality, consist solely of a single oil pan), are configured to stow or store hydraulic fluid, such as transmission oil 28, for distribution to the transmission 12 and its various components. The main pump 22 is fluidly connected to the first (or main) sump volume 27A to draw transmission oil 28 therefrom. The auxiliary pump 24 is fluidly connected to the second (or auxiliary) sump volume 27B to draw transmission oil 28 therefrom.

A distributed control system, which may include, but is not limited to, an engine control module (ECM), a transmission control module (TCM), and an energy storage control module (ESCM), is depicted collectively in FIG. 1 in an exemplary embodiment as a single micro-processor based electronic control unit (ECU) 30. The ECU 30 (also referred to herein as "controller") has a suitable amount of programmable memory that is programmed to include, among other things, an algorithm or method 100 of regulating a hydraulic control system, as will be discussed in further detail hereinbelow with respect to FIGS. 4A and 4B. The ECU 30 is in operative communication with the main pump 22, the auxiliary pump 24, and first and second pressure control solenoids 42 and 44, respectively. The ECU 30 is preferably programmed and configured, in part, to control the individual and cooperative operation of the hydraulic control system 10, transmission 12, and engine 14. Those skilled in the art will recognize and understand that the means of communication utilized by the controller 30 is not restricted to the use of electric cables ("by wire"), but may be, for example, by radio frequency and other wireless technology, fiber optic cabling, etc.

A main regulator valve, indicated generally at 32 in FIG. 1, is in direct fluid communication with the main pump 22 via first hydraulic conduit or circuit 34. The main regulator valve 32, which is in the nature of a spring-biased, multi-port spool valve assembly, is configured to regulate the flow of pressurized hydraulic fluid from the main pump 22 (e.g., the first flow of pressurized hydraulic fluid F1). A decrease circuit 40 also fluidly connects the main regulator valve 32 directly to the main pump 22. The decrease circuit 40 acts as a "feedback circuit" for the main pump 22, essentially redirecting hydraulic fluid 28 from the main regulator valve 32 back to the main pump 22 to reduce output from the main pump 22 under predetermined circumstances (e.g., when pressure output from the main pump 22 exceeds a threshold value).

An auxiliary regulator valve, indicated generally at 36, is in direct fluid communication with the auxiliary pump 24 via second hydraulic conduit 38. The auxiliary regulator valve 36, which is also preferably in the nature of a spring-biased, multi-port spool valve assembly, is configured to regulate the flow of pressurized hydraulic fluid from the auxiliary pump 24 (i.e., the second flow of pressurized hydraulic fluid F2). As will be described in further detail hereinbelow, the auxiliary regulator valve 36 is configured to exhaust (i.e., evacuate) hydraulic fluid through the exhaust port 37 if the flow of pressurized hydraulic fluid from the main pump 22 or aux pump 24 exceeds a maximum regulated auxiliary pump pressure, thereby preventing the aux pump 24 from stalling.

A first pressure control solenoid 42 (referred to hereinafter as "PCS1") is in direct fluid communication with the main regulator valve 32 via third hydraulic conduit 46. In addition, a second pressure control solenoid 44 (referred to hereinafter as "PCS2") is in direct fluid communication with the auxiliary regulator valve 36 via fourth hydraulic conduit 48. PCS1 42 is placed in direct fluid communication with PCS2 44 by fifth hydraulic conduit 50. According to the preferred embodiment of FIG. 1, PCS1 42 is characterized by a lack of a direct fluid communication with the auxiliary regulator valve 36. Similarly, PCS2 44 is preferably characterized by a lack of a direct fluid communication with the main regulator valve 32.

PCS1 42 and PCS2 44 operate to modify (i.e., control modulation of) the main regulator valve 32 and the auxiliary regulator valve 36, respectively, such that at least one of the flows of pressurized fluid from the main pump 22 and auxiliary pump 24 directed to the transmission 12 is equal to the current transmission line pressure requirements during all vehicle operations, including when the engine 14 is transitioning to auto-start and auto-stop, as well as when the engine 14 is in auto-start and auto-stop (e.g., when the vehicle 10 is operating in either engine-on or engine-off mode). Put another way, PCS1 42 and PCS2 44, which may be open- or closed-type solenoids, are in electric signal communication with the controller 30, and actuated upon receipt of a control signal therefrom. When commanded, PCS1 42 delivers a first boost pressure, illustrated in FIG. 1 for explanatory purposes by arrow B1, to the main regulator valve 32, and thereby boosts output of the main pump 22 from a baseline, non-boosted operating pressure. That is, the boost pressure B1 acts to bias the main regulator valve 32, increasing the pressure of fluid output therefrom to the transmission 12. Finally, PCS2 44, when commanded, delivers a boost pressure, illustrated in FIG. 1 by arrow B2, to the auxiliary regulator valve 36, and thereby boosts output of the auxiliary pump 24 from a baseline, non-boosted operating pressure. The boost pressure B2 acts to bias the auxiliary regulator valve 36, increasing the pressure of fluid output therefrom to the transmission 12.

Figure 2:
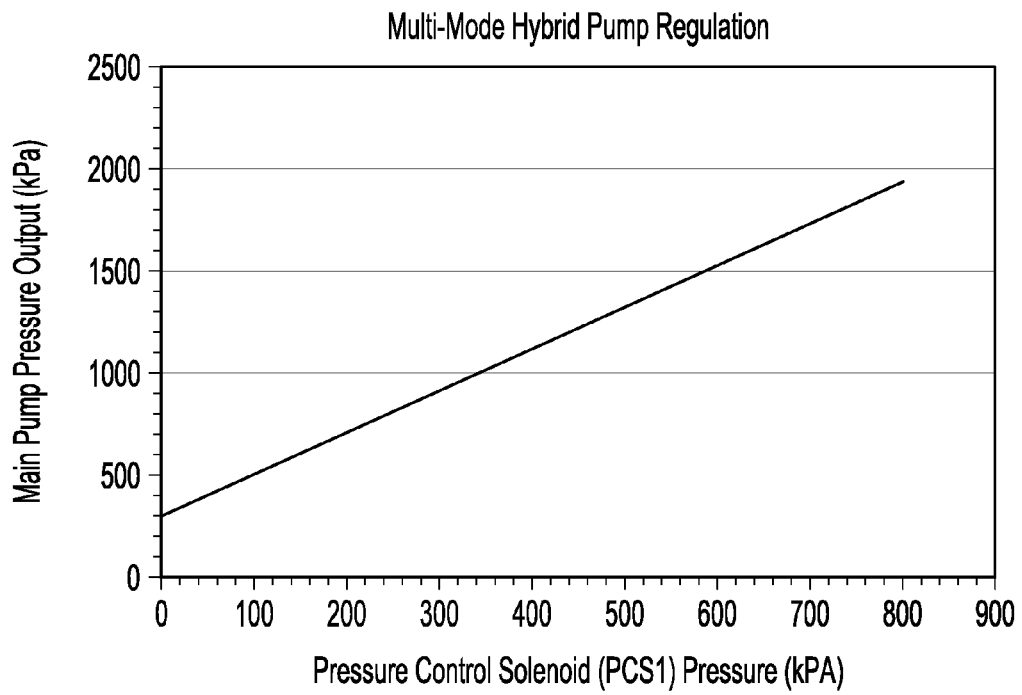
FIG. 2 is a graphical representation of the boosted pressure output of the main pump of FIG. 1 utilizing an independent pressure control solenoid.
Figure 3:
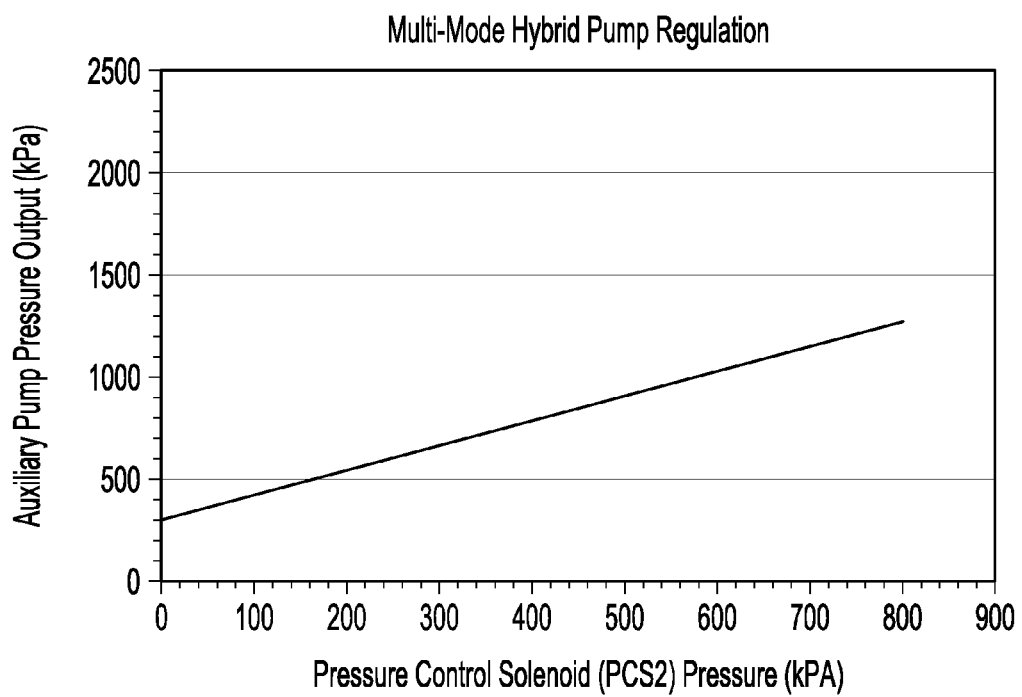
FIG. 3 is a graphical representation of the boosted pressure output of the auxiliary pump of FIG. 1 utilizing an independent pressure control solenoid.

According to the preferred embodiment of the present invention, the main pump 22 has a non-boosted line pressure of approximately 300 kilopascals (kPa), and the main regulator valve 32 has a boost gain of approximately 2.05. Additionally, as can be seen in the graphical illustration of the boosted pressure output of the main pump 22 of FIG. 2, the main pump 22 pressure regulation and boost function operates according to the following equation: MainLinePress=2.05*PCS1+300. Accordingly, the flow of pressurized hydraulic fluid from the main pump 22 preferably has a maximum line pressure of approximately 1800-2000 kPa, which depends, in part, on the actual maximum output of the first pressure control solenoid. In a similar regard, the auxiliary pump 24 preferably also has a non-boosted line pressure of approximately 300 kPa, whereas the auxiliary regulator valve 36 has a boost gain of approximately 1.24. What is more, the graphical representation of the boosted pressure output of the auxiliary pump 24 in FIG. 3 indicates that the auxiliary pump 24 pressure regulation and boost function operates according to the following equation: AuxLinePress=1.24*PCS2+300. Thus, the flow of pressurized hydraulic fluid from the auxiliary pump 24 preferably has a maximum line pressure of approximately 1200-1300 kPa, which depends, in part, on the actual maximum output of the second pressure control solenoid.

A boost accumulator valve 52 is in direct fluid communication with the auxiliary regulator valve 36 via sixth hydraulic conduit 54. The boost accumulator valve 52 operates to damp fluid pressure fluctuations generated by PCS2 44 and movement of the auxiliary regulator valve 36 to protect the auxiliary pump 24, for example, from inadvertent pressure spikes which may cause the aux pump 24 to stall. Put another way, the boost accumulator valve 52 is positioned to accumulate control pressure fluid provided to the auxiliary regulator valve 36 from PCS2 44 through hydraulic conduit 48.

With continuing reference to FIG. 1, the hydraulic control system 10 also includes a transmission oil cooler system (TOC), represented schematically by ellipsoid 60. The TOC 60 is in fluid communication with the auxiliary regulator valve 36 via seventh hydraulic conduit 62, whereas the main regulator valve 32 is fluidly communicated with the TOC 60 via seventh and eighth hydraulic conduits 62 and 64, respectively. A cooler relief valve 66 is placed in between the TOC 60 and main regulator valve 32. The cooler relief valve 66 is operable to restrict fluid flow therethrough—i.e., exhaust fluid through an exhaust port 68 thereof if the flow of pressurized hydraulic fluid from the main pump 22 exceeds a predetermined level.

The auxiliary regulator valve 36 is also in direct fluid communication with the cooler relief valve 66 via seventh hydraulic conduit 62. In this instance, the auxiliary regulator valve 36 includes an exhaust port 74. The auxiliary regulator valve 36 exhausts fluid through the exhaust port 37 if pressurized hydraulic fluid from the cooler relief valve 66 (i.e., fluid distributed therethrough by main pump 22) exceeds a maximum regulated auxiliary pump pressure.

A thermal bypass valve 76 may also be placed intermediate the TOC 60 and both the main and auxiliary regulator valves 32, 36. The thermal bypass valve 76 is operable to redirect fluid flow past the TOC 60 under specified pressure and temperature conditions—specifically, when oil temperature is less than a predetermined level or cooler pressure drop is greater than a predetermined level.

A shuttle-type ball check valve assembly, identified generally as 58 in FIG. 1, is shown in direct fluid communication with the main regulator valve 32 and aux regulator valve 36 via ninth and tenth hydraulic conduits 70 and 72, respectively. The check valve 58 and regulator valves 32, 36 define, in part, a "shift valve system" that is configured to control engagement and disengagement of one or more torque transmitting devices housed within transmission 12, such as, but not limited to hydraulic clutches and brakes (not shown herein). The check valve assembly 58 determines whether pressurized fluid is supplied to the transmission 12 via eleventh hydraulic conduit 74 from the ninth hydraulic conduit 70, namely main pump 22, or whether pressurized fluid is supplied to eleventh hydraulic conduit 74 from the tenth hydraulic conduit 72, namely aux pump 24.

Figure 4A:
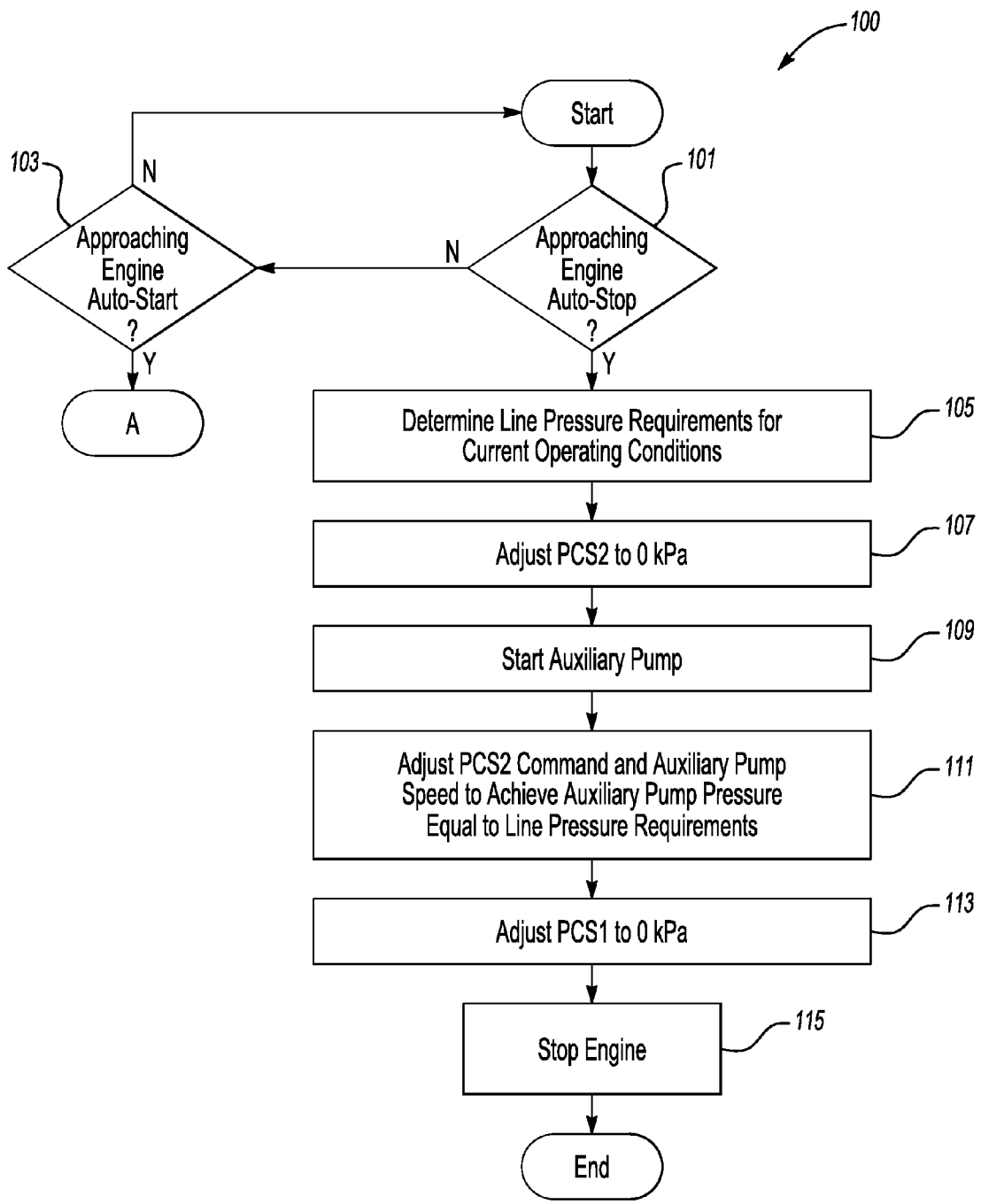
FIGS. 4A and 4B provide a flow chart illustrating a method of regulating a hydraulic control system in accordance with the present invention.
Figure 4B:
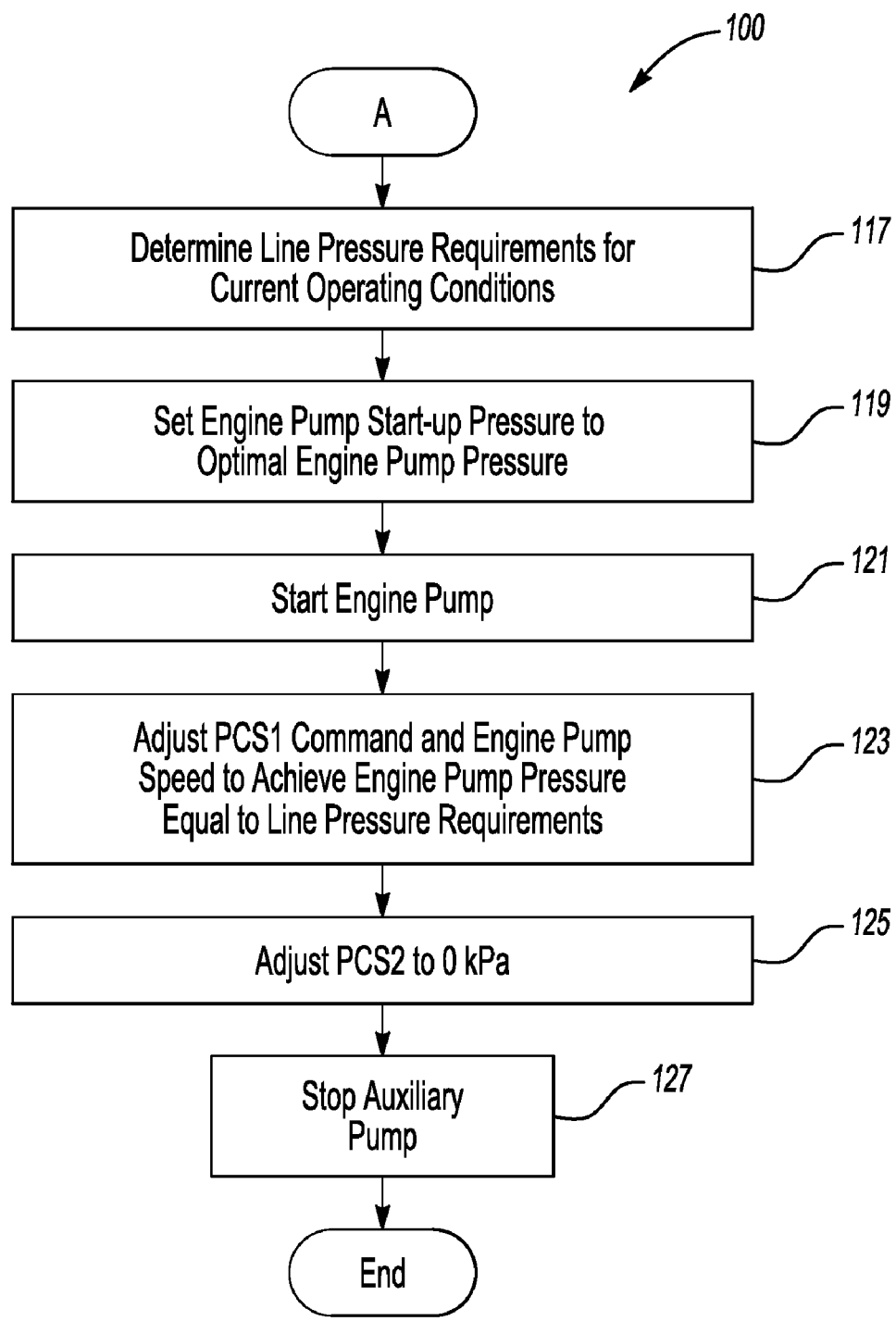

With reference now to the flow charts in FIGS. 4A and 4B, a method of regulating a hydraulic control system for a multi-mode hybrid-type power transmission is shown generally as 100 in accordance with a preferred embodiment of the present invention. The method or algorithm 100 is described herein with respect to the structure illustrated in FIG. 1. However, the methods of the present invention may also be incorporated into other powertrain configurations, and applied to various other types of power transmissions. The method 100 preferably includes at least steps 101-127. However, it is within the scope and spirit of the present invention to omit steps, include additional steps, and/or modify the order of steps presented in FIGS. 4A and 4B.

Looking to FIG. 4A, the method 100 begins with determining if the engine is transitioning to an engine auto-stop, in step 101, or whether the engine 14 is transitioning to an engine auto-start, in step 103. Notably, steps 101 and 103, and any corresponding subsequent steps, can be performed simultaneously, or in any order. If the engine 14 is transitioning to an auto-stop, step 105 then includes determining the line pressure requirements of the transmission 12 for the current operating conditions. The line pressure requirements are based, for example, on vehicle operator demands for torque and acceleration, as well as the range the transmission 12 is in at that particular time. The current line pressure requirements will be equal to the main pump 22 output pressure (i.e., MainLinePress) during engine-on operation.

At step 107 in FIG. 4A, PCS2 44 is set to zero output (0 kPa), such that the aux pump 24 is started at minimum operating pressure. That is, the start-up pressure of the auxiliary pump 24 is set to the minimum auxiliary pump pressure (e.g., 300 kPa) by closing PCS2, and thereby eliminating any boost pressure distributed to the auxiliary regulator valve 36 by PCS2 44. Contemporaneously therewith, in step 109, the auxiliary pump 24 is started. Thereafter, the current auxiliary pump pressure is modified to equal the current line pressure requirements. Specifically, in step 111, the aux pump speed is increased, and the boost pressure being distributed by PCS2 44 is modified (i.e., increased) such that the second flow of hydraulic fluid F2 from aux pump 24 is pressurized according to current system demands. Once the output from aux pump 24 meets current system demands—i.e., the current auxiliary pump pressure is equal to the current transmission line pressure requirements, the main pump 22 is shut down or stopped in step 115.

It is preferred that the method 100 also includes reducing the current main pump pressure to equal the minimum main pump operating pressure (e.g., 300 kPa) prior to stopping or shutting down the main pump 22. As seen in step 113, the main pump pressure can be reduced, for example, by closing PCS1 42, and thereby eliminating boost pressure distributed to the main regulator valve 32 by PCS1 42.

If the engine 14 is transitioning to an auto-start (i.e., engine restart), the method 100 then includes determining the line pressure requirements of the transmission 12 for the current operating conditions, as indicated in step 117 of FIG. 4B. Unlike step 105 above, the current line pressure requirements in this instance will be equal to the aux pump 24 output pressure (i.e., AuxLinePress) during engine-off operation. At step 119 in FIG. 4B, the start-up pressure of the main pump 22 is set equal to an optimal main pump pressure. That is, the main pump start-up pressure can be optimized by setting PCS1 to an optimal boost gain pressure for the transition to engine auto-start for that particular powertrain configuration. By utilizing separate pressure control solenoids for pressure regulation and boost function operation, the output of the main pump 22 and aux pump 24 can be individually optimized under all operating conditions.

Prior to, contemporaneously with, or after step 119, the engine pump 22 is started in step 121. The active main pump pressure is thereafter modified to equal the current transmission line pressure requirements. Specifically, in step 123, the engine pump speed is increased, and the boost pressure being distributed by PCS1 42 is modified (i.e., increased) such that the first flow of hydraulic fluid F1 from main pump 22 is pressurized in accordance to current system demands. Once the output from main pump 22 meets current system demands—i.e., the current main pump pressure is equal to the current line pressure requirements, the auxiliary pump 24 is shut down or stopped in step 127.

Ideally, the method 100 also includes reducing the current auxiliary pump pressure to equal the minimum aux pump operating pressure (e.g., 300 kPa) prior to stopping or shutting down the main pump 22. As shown in step 125, the aux pump pressure can be reduced, for example, by closing PCS2 44, and thereby eliminating boost pressure distributed to the auxiliary regulator valve 36 by PCS2 44.

While the best modes for carrying out the present invention have been described in detail hereinabove, those familiar with the art to which this invention relates will recognize various alternative designs and embodiments for practicing the invention within the scope of the appended claims.

The invention claimed is:

1. A method of regulating a hydraulic control system operable to distribute pressurized fluid to a hybrid transmission in power flow communication with an engine and at least one motor, the hydraulic control system including a main pump in fluid communication with a main regulator valve, and an auxiliary pump in fluid communication with an auxiliary regulator valve, the method comprising:
   determining if the engine is transitioning to an engine auto-stop;
   determining a first current line pressure requirement of the transmission if the engine is transitioning to an engine auto-stop;
   setting a start-up auxiliary pump pressure equal to a minimum auxiliary pump pressure;
   starting the auxiliary pump;
   increasing a speed of the auxiliary pump;
   modifying a current auxiliary pump pressure to equal said first current line pressure requirement by providing a first boost pressure to the auxiliary regulator valve with a first pressure control solenoid in fluid communication therewith; and
   stopping the main pump.

2. The method of claim 1, wherein said setting a start-up auxiliary pump pressure equal to a minimum auxiliary pump pressure includes closing said first pressure control solenoid and thereby eliminating boost pressure distributed to the auxiliary regulator valve from said first pressure control solenoid.

3. The method of claim 1, further comprising:
   reducing a current main pump pressure to equal a minimum main pump pressure prior to stopping the main pump.

4. The method of claim 3, wherein said reducing a current main pump pressure includes closing a second pressure control solenoid in fluid communication with the main regulator valve and thereby eliminating boost pressure distributed to the main regulator valve from said second pressure control solenoid.

5. The method of claim 1, wherein said stopping the main pump is in response to said current auxiliary pump pressure being equal to said first current line pressure requirement.

6. The method of claim 1, further comprising:
   determining if the engine is transitioning to an engine auto-start;
   determining a second current line pressure requirement of the transmission if the engine is transitioning to an engine auto-start;
   setting a start-up main pump pressure equal to an optimal main pump start-up pressure;
   starting the main pump;
   increasing a speed of the main pump;
   modifying a current main pump pressure to equal said second current line pressure requirement by providing a second boost pressure to the main regulator valve with a second pressure control solenoid in fluid communication therewith; and
   stopping the auxiliary pump.

7. The method of claim 6, wherein said setting a start-up main pump pressure equal to an optimal main pump start-up pressure includes commanding said second pressure control solenoid to distribute an optimal boost gain pressure to the main regulator valve.

8. The method of claim 6, further comprising:
   reducing said current auxiliary pump pressure to equal said minimum auxiliary pump pressure prior to stopping the auxiliary pump.

9. The method of claim 8, wherein said reducing said current auxiliary pump pressure includes closing said first pressure control solenoid and thereby eliminating boost pressure distributed to the auxiliary regulator valve by said first pressure control solenoid.

10. The method of claim 6, wherein said stopping the auxiliary pump is in response to said current main pump pressure being equal to said second current line pressure requirement.

11. A method of regulating a hydraulic control system for a multi-mode hybrid power transmission in power flow communication with an engine and at least one motor, the hydraulic control system including an engine-driven main pump in fluid communication with a main regulator valve, and an electrically driven auxiliary pump in fluid communication with an auxiliary regulator valve, the method comprising:
   determining if the engine is transitioning to one of an engine auto-stop and an engine auto-start;
   determining a current line pressure requirement of the transmission if the engine is transitioning to one of an engine auto-stop and an engine auto-start;
   setting a start-up auxiliary pump pressure equal to a minimum auxiliary pump pressure if the engine is transitioning to an engine auto-stop, or setting a start-up main pump pressure equal to an optimal main pump start-up pressure if the engine is transitioning to an engine auto-start;
   starting one of the auxiliary pump if the engine is transitioning to an engine auto-stop and the main pump if the engine is transitioning to an engine auto-start;
   increasing a speed of said one of the auxiliary pump and main pump;
   modifying a current pump pressure of said one of the auxiliary pump and main pump to equal said current line pressure requirement by providing a boost pressure to a corresponding one of the auxiliary regulator valve and main regulator valve with one of a first pressure control solenoid in fluid communication with the auxiliary regulator valve and a second pressure control solenoid in fluid communication with the main regulator valve; and
   stopping the other of said one of the auxiliary pump and main pump.

12. The method of claim 11, wherein said setting a start-up auxiliary pump pressure equal to a minimum auxiliary pump pressure includes closing said first pressure control solenoid and thereby eliminating boost pressure distributed to the auxiliary regulator valve from said first pressure control solenoid.

13. The method of claim 11, further comprising:
   reducing a current main pump pressure to equal a minimum main pump pressure prior to stopping the main pump if the engine is transitioning to an engine auto-stop, wherein said reducing a current main pump pressure includes closing said second pressure control solenoid and thereby eliminating boost pressure distributed to the main regulator valve from said second pressure control solenoid.

14. The method of claim 11, wherein said setting a start-up main pump pressure equal to an optimal main pump start-up pressure includes commanding said second pressure control solenoid to distribute an optimal boost gain pressure to the main regulator valve.

15. The method of claim 11, further comprising:
reducing a current auxiliary pump pressure to equal said minimum auxiliary pump pressure prior to stopping the auxiliary pump if the engine is transitioning to an engine auto-start, wherein said reducing a current auxiliary pump pressure includes closing said first pressure control solenoid and thereby eliminating boost pressure distributed to the auxiliary regulator valve by said first pressure control solenoid.

16. A hydraulic control system for regulating distribution of pressurized fluid to a hybrid transmission in power flow communication with an engine and at least one motor, the transmission having a power source, at least one hydraulic fluid reservoir, and a current line pressure requirement, the hydraulic control system comprising:
a main pump in fluid communication with the at least one hydraulic fluid reservoir and in driving communication with the engine, said main pump selectively operable to provide a first flow of pressurized hydraulic fluid to the transmission;
an auxiliary pump in fluid communication with the at least one hydraulic fluid reservoir and in driving communication with the power source, said auxiliary pump selectively operable to provide a second flow of pressurized hydraulic fluid to the transmission;
a main regulator valve in fluid communication with said main pump and configured to regulate said first flow of pressurized hydraulic fluid;
an auxiliary regulator valve in fluid communication with said auxiliary pump and configured to regulate said second flow of pressurized hydraulic fluid;
a first pressure control solenoid in fluid communication with said main regulator valve and configured to provide a first boost pressure to the main regulator valve and thereby boost output of said main pump;
a second pressure control solenoid in fluid communication with said auxiliary regulator valve and configured to provide a second boost pressure to the auxiliary regulator valve and thereby boost output of said auxiliary pump; and
a controller in operative communication with said first and second pressure control solenoids and operable to control the same, wherein said controller is configured to selectively modify distribution of said first and second boost pressures such that at least one of said first and second flows of pressurized fluid is equal to the current line pressure requirement of the transmission during engine auto-start and auto-stop and transitions thereto.

17. The hydraulic control system of claim 16, wherein said first pressure control solenoid is characterized by a lack of a direct fluid communication with said auxiliary regulator valve, and said second pressure control solenoid is characterized by a lack of a direct fluid communication with said main regulator valve.

18. The hydraulic control system of claim 16, further comprising:
a boost accumulator valve in fluid communication with said auxiliary regulator valve and operable to damp fluid pressure fluctuations generated by said second pressure control solenoid and movement of said auxiliary regulator valve.

19. The hydraulic control system of claim 16, further comprising:
a transmission oil cooler system in fluid communication with said main regulator valve and auxiliary regulator valve; and
a cooler relief valve intermediate said main regulator valve and said transmission oil cooler system, and operable to restrict fluid flow from said main regulator valve therethrough.

20. The hydraulic control system of claim 16, wherein said auxiliary regulator valve includes an exhaust port, said auxiliary regulator valve being configured to exhaust hydraulic fluid through said exhaust port if said first flow of pressurized hydraulic fluid exceeds a maximum regulated auxiliary pump pressure.

\* \* \* \* \*